April 21, 1953  S. D. KLINGER  2,635,589
GAS ENGINE
Filed Jan. 11, 1947  6 Sheets-Sheet 1

INVENTOR
STUART D. KLINGER
ATTORNEY

INVENTOR
STUART D. KLINGER
BY Paul L. Kohn
ATTORNEY

April 21, 1953      S. D. KLINGER      2,635,589

GAS ENGINE

Filed Jan. 11, 1947      6 Sheets-Sheet 3

INVENTOR
STUART D. KLINGER
By Paul L. Keeler
ATTORNEY

INVENTOR
STUART D. KLINGER
By Paul L. Kirkel
ATTORNEY

April 21, 1953 S. D. KLINGER 2,635,589
GAS ENGINE
Filed Jan. 11, 1947 6 Sheets-Sheet 5
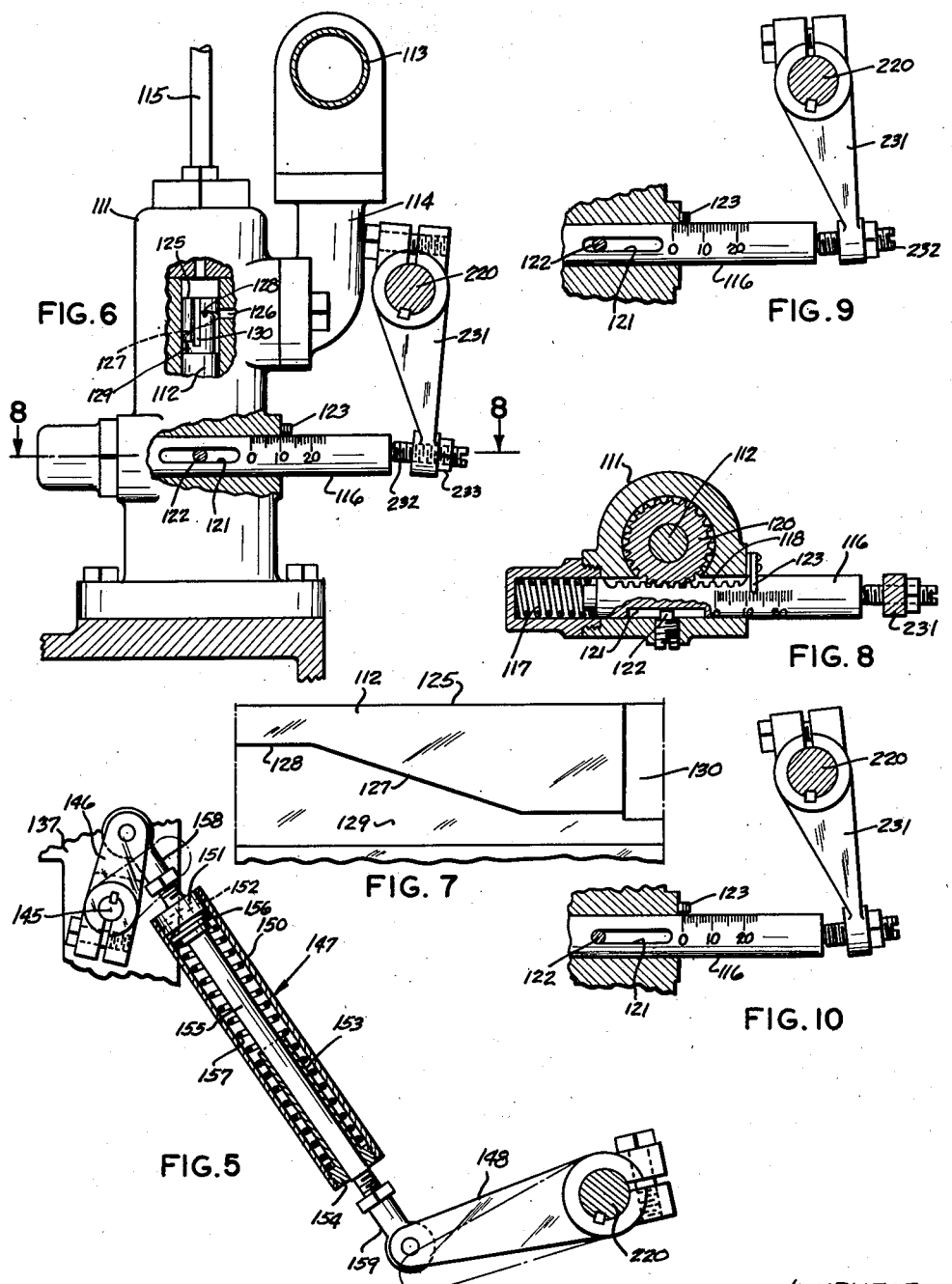
INVENTOR
STUART D. KLINGER
By Paul L. Kirher
ATTORNEY April 21, 1953     S. D. KLINGER     2,635,589
GAS ENGINE Filed Jan. 11, 1947     6 Sheets-Sheet 6

INVENTOR
STUART D. KLINGER
BY Paul L. Kohler
ATTORNEY

Patented Apr. 21, 1953

2,635,589

UNITED STATES PATENT OFFICE 2,635,589

GAS ENGINE

Stuart D. Klinger, Beloit, Wis., assignor to Fairbanks, Morse & Co., Chicago, Ill., a corporation of Illinois Application January 11, 1947, Serial No. 721,593

3 Claims. (Cl. 123—27)

This invention relates to internal combustion engines generally and is more particularly concerned with an engine of high compression type, such as a diesel, having an improved system of fuel supply and control therefor affording the ready conversion thereof to a gas engine operating on the diesel cycle.

The important principles involved in an engine of the present type, that is a two-cycle diesel engine, have been disclosed in great detail in a prior application for patent, entitled Gas Engine, filed in the name of Clarence H. Schowalter on February 23, 1945, and bearing Serial No. 579,374, now Patent No. 2,562,511. As was there pointed out, the improvements provide a high compression gas engine wherein the compression pressure attained is of the order of that normally occurring in a diesel engine of comparable size, in which is embodied a gaseous fuel combustion space auxiliary to the cylinder combustion space and having a restricted communication with the latter. In operation, gaseous fuel is supplied under a pressure which is very materially less than the maximum compression pressure attained in the engine and is introduced to the auxiliary combustion space in quantity determined according to engine loading, with admission initiated and completed in a period of relatively low cylinder compression during the compression stroke of the piston. Prior to fuel combustion, the major portion of the gaseous fuel charge so admitted, is retained in the auxiliary space, and during the compression cycle of the engine, is thoroughly mixed with cylinder combustion air forced into the auxiliary space along with whatever gas may initially reach the cylinder space, to result in a rich gaseous fuel-air mixture. Combustion of the gaseous fuel charge, as compressed in the auxiliary space, is effected in a positive manner by an igniting charge of a liquid fuel admitted by solid injection directly into the cylinder combustion space, with admission of the liquid fuel timed to occur near the end of the piston compression stroke thereby affording compression-ignition of the liquid fuel charge as in the diesel cycle. It is important, for assuring positive gaseous fuel ignition while effecting desirable economy of igniting liquid fuel consumption, that the quantity of the liquid fuel igniting charge so injected be preferably less than that quantity determined to be just sufficient for operating the engine at rated idling speed under no load when supplied with such liquid fuel alone.

It is therefore an important object of the present invention to provide, in connection with an internal combustion engine of the general character above pointed out, means for supplying liquid and gaseous fuels thereto whereby the engine may be operated on either the liquid fuel or gaseous fuel accompanied by a small combustion initiating quantity or pilot charge of the liquid fuel.

Another important object of this invention resides in the improved construction, arrangement and operation of control agencies for use with an internal combustion engine of two-cycle diesel type whereby the utilization of a liquid fuel for starting and a gaseous fuel for normal load operation may be carried out effectively and with direct and positive control over the supply of such fuels.

Another object of the invention resides in the greatly simplified and positive operation of novel control expedients for selectively conditioning the engine to utilize liquid fuel alone or for altering this condition of engine operation such that a gaseous fuel may be utilized in conjunction with a pilot charge of liquid fuel for initiating the combustion of the gaseous fuel, the liquid fuel supply being positively limited to a quantity which is insufficient of itself to maintain the operation of the engine at no load idling conditions.

A further object is to provide a dual fuel engine of diesel type which will operate effectively on liquid or gaseous fuels, and in which a fuel supply selectivity control system is provided to effect rapid and positive conversion of the engine for operation on either fuel, through control responsive means including an engine speed responsive governor, in control of the supply of the liquid and gaseous fuels.

Other objects of the invention reside in the new and useful combination of control means and elements associated with an internal combustion engine constructed in such manner as to be capable of conversion from a liquid fuel combustion to a gaseous fuel combustion engine operating on the diesel cycle, and in the improvements relating to the features of construction and operation of certain elements of mechanism incorporated in the control system.

The invention in a preferred form has been disclosed in the accompanying drawing, in which:

Fig. 5 is a fragmentary detail view partly in section, of a safety device for use with the present engine arrangement;

Fig. 6 is an elevational view of a liquid fuel pump construction in which portions of the pump casing have been broken away to show certain important features which contribute to the successful operation of the present engine;

Fig. 7 is a view of the pump plunger head development in which the variable cut-off scroll contour is shown to advantage;

Fig. 8 is a sectional detail view taken at line 8—8 in Fig. 6;

Fig. 9 is a fragmentary view of the liquid fuel pump control means and actuator as the same would appear with the engine running at approximately rated idling speed with no load;

Fig. 10 is a view similar to Fig. 9 but showing the liquid fuel pump control at its pilot fuel charge delivery setting.

Figure 1:
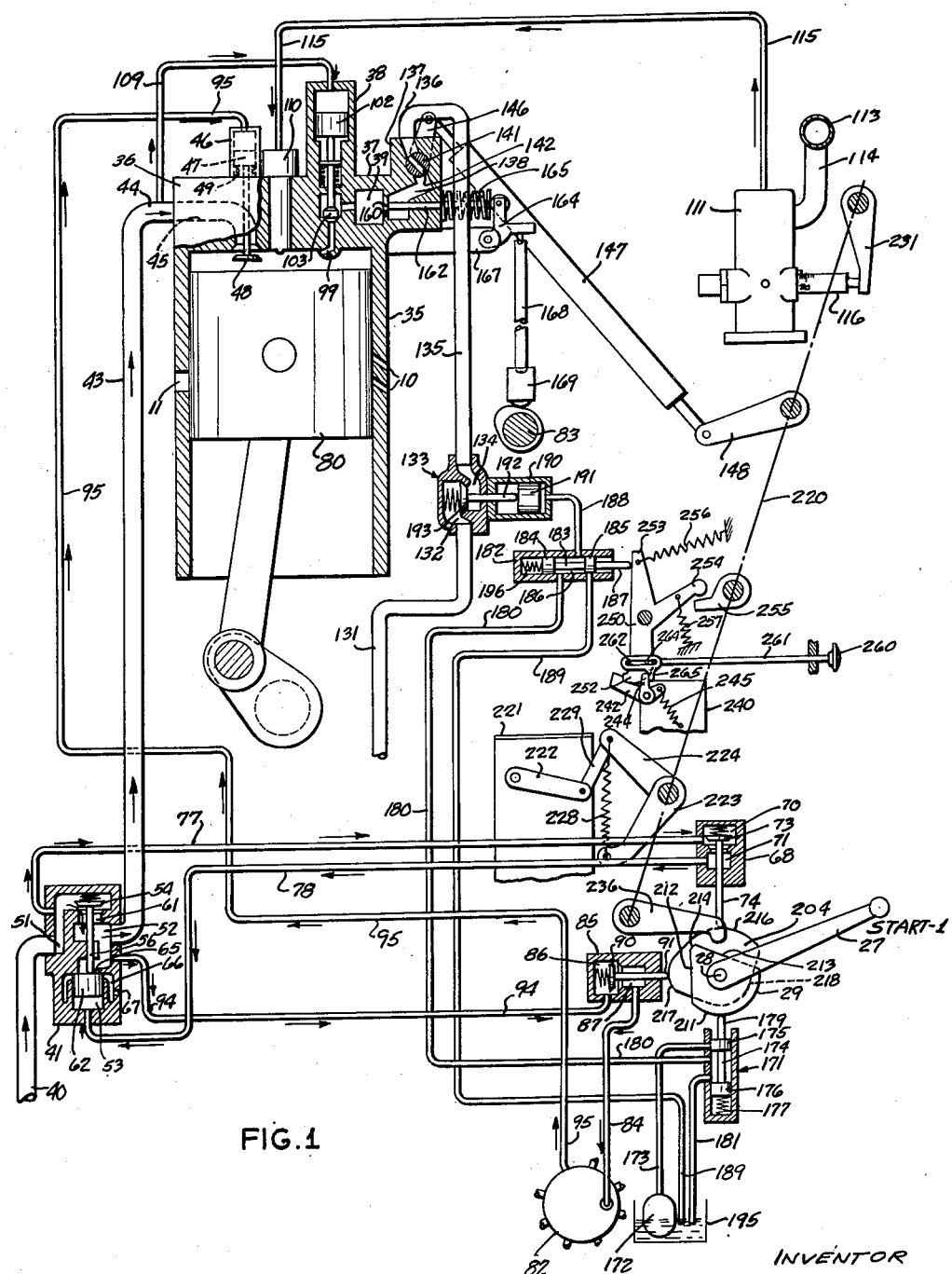
Fig. 1 is a schematic layout of the complete control system for use with an engine of the present character, the control system being shown as conditioned for normal air starting.

Turning now to the drawings illustrating a preferred form which the present control system may take, Fig. 1 shows the system in application to a two-cycle diesel engine providing a cylinder block structure having one or more cylinders, as the cylinder 35, cylinder head 36, an auxiliary combustion chamber means 37 for each cylinder, and an auxiliary cylinder means 38 at each engine cylinder. As shown, the cylinder 35 is provided with cylinder scavenging and combustion air intake ports 10 and exhaust ports 11 which are piston-controlled in reciprocation of the piston 80. In addition the engine assembly includes an air start system, a liquid fuel supply system, a gaseous fuel supply system and a selectivity control system whereby the aforementioned systems may be brought into and out of effective operation all as will be explained in more detail hereafter.

*Air start system*

Referring further to Fig. 1, it will be observed that a main compressed air supply line 40 connected with a principal source of compressed air (not shown) leads to an air relay valve 41, and from the latter to an air header line 43 which in the instance of a multi-cylinder engine, extends along the engine adjacent each of the cylinders 35. From this header, air is conducted through a branch line 44 to the cylinder head 36 and then through an internal passage 45 formed in such head to an air operated admission valve. This latter valve assembly is of generally conventional construction and as shown diagrammatically in Fig. 1, includes a housing 46, a piston element 47 reciprocable in the chamber formed in housing 46 and directly connected to the stem of poppet valve 48. A coiled spring 49 is provided for maintaining the poppet valve 48 closed except at such times as air at header pressure is admitted to the space above the piston 47 as will appear presently.

The air relay valve 41 comprises a housing suitably formed to provide an inlet chamber 51, an outlet chamber 52 and a pilot piston chamber 53. Between the air inlet and outlet chambers is mounted a poppet valve 54 having a valve stem 56 and normally spring urged to closed position relative to the passage or port 61. The pilot piston 62 movably mounted in chamber 53, is adapted upon upward movement to abut the free end of the poppet valve stem 56 and move the valve to open the port 61 between air inlet and outlet chambers 51 and 52 respectively. Coincident with this movement of the pilot piston 62, the upper peripheral surface of the pilot piston closes a port 65 formed between chamber 52 and an annular chamber 66 surrounding the pilot piston chamber 53, thus cutting off communication between chambers 52 and 66 so that air admitted to the former cannot flow into the latter and hence be exhausted to atmosphere through relief port 67 formed through the outer wall of the chamber 66.

Effective operation of the air relay valve 41 to supply air to header 43 is obtained through the use of a relay control valve such as the one shown at 68 in which the valve housing is formed with an air inlet chamber 70, an air outlet chamber 71 and an intervening port controlled by a poppet valve 73 which is slidably mounted in the housing by means of the enlarged stem 74. The poppet valve 73 is normally spring urged to closed position. Air supplied to the inlet chamber 70 of this relay control valve is obtained from a suitable point in the inlet chamber 51 of the air relay valve, as by the conduit 77. As a result, when poppet valve 73 of the control valve 68 is opened, by means to be noted presently, the air at line pressure will pass to outlet chamber 71 and into a branch line or conduit 78 for delivery to the pilot piston chamber 53 in air relay valve housing, as at the bottom of the chamber below the pilot piston 62. The air admitted to this chamber at line pressure, is sufficient to open the poppet valve 54 against the force of its spring bias and the pressure of the air in inlet chamber 51. Thus air flows into chamber 52 and is supplied to the main header 43 and to each of the branch lines 44 for admission to the cylinders to impart a starting rotational effort to the pistons reciprocable therein, one such piston 80 being shown in Fig. 1.

Engine starting air is admitted to the cylinders in the sequence or order determined therefor, and accordingly an engine driven air distributor device 82 is arranged to have its rotor element (not shown) driven from the engine camshaft which in the disclosure of Fig. 1 is indicated schematically at 83. The distributor receives its supply of compressed air from supply conduit 84 which is controlled by a distributor control valve 85 structurally similar to the relay control valve 68 described above. Thus, the valve 85 is formed to provide an inlet chamber 86, an outlet chamber 87, and a poppet type valve 90 controlling communication between the chambers and which is provided with an enlarged stem 91 projecting into the path of operating means, later to be described. The poppet valve is normally spring urged to a closed position. The valve 85 receives its supply of air under pressure through conduit 94 from a tapped connection at outlet chamber 52 of relay valve 41, and at such times as the poppet valve 90 is open, air will be delivered from the valve outlet chamber 87 to conduit 84 for supply to the air distributor device 82. In the usual distributor construction the rotor element (not shown) is adapted to deliver air to each one of a plurality of branch lines, as the one shown at 95, in a predetermined order or sequence. This has the desired effect of opening the air admission valves 46 at the respective cylinders 35 such that line air pressure from branch conduits 44 may enter the cylinders successively to impart the necessary starting impulse for initiating engine crankshaft rotation.

Figure 11:
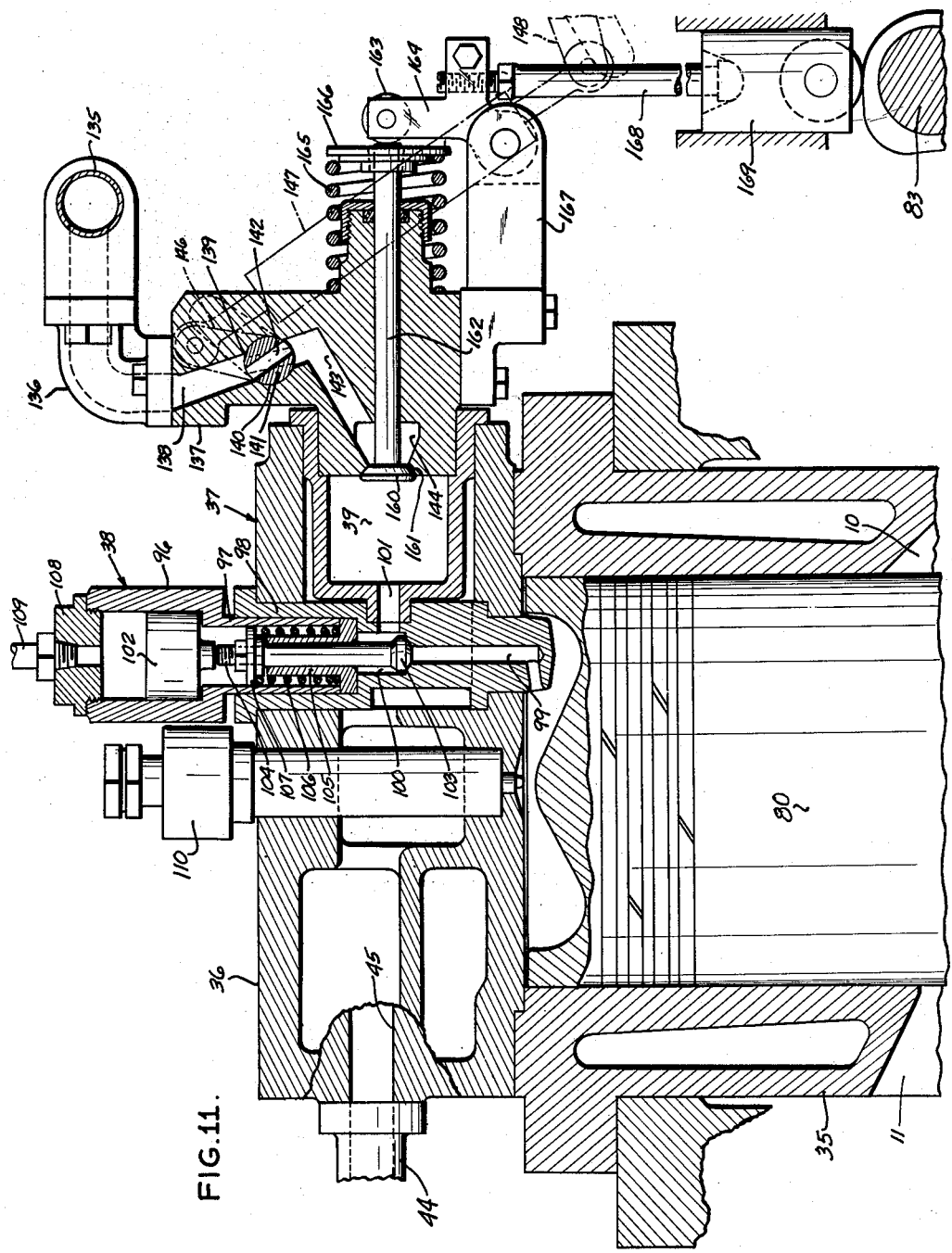
Fig. 11 is a fragmentary sectional view of the cylinder and head assembly illustrating details of the auxiliary combustion chamber and associated parts.

The present air starting system also includes means for isolating the auxiliary combustion chamber means 37 from the main combustion space in cylinder 35. As shown by Figs. 1 and 11, the cylinder head 36 is provided with an auxiliary cylinder means 38 comprising a tubular member 96 having a reduced diameter portion 97 extending into a socket or thimble means 98 secured in the cylinder head 36 such that a passage 99 formed in the lower end of the socket means communicates with the main cylinder combustion space at its lower end and opens into a small chamber 100 at its upper end. The chamber 100 is placed in open communication through passage 101 with the interior chamber 39 proper of auxiliary combustion means 37, as shown. The auxiliary cylinder means 38 contains a small piston 102 slidably movable therein for actuation of a valve element 103 through abutment with the upper end of the valve stem 104, the latter being guided in a tubular sleeve 105 and constantly urged in an upward direction by means of spring 106 which presses against the stem collar 107. The threaded cylinder cap 108 is apertured to receive one end of an air supply conduit 109 which, in turn, is connected at its opposite end with the engine starting air branch conduit or line 44 such that air at line pressure may force piston 102 downwardly thus seating the valve element 103 over passage 99, thereby isolating the auxiliary combustion chamber 39 from the main combustion space. In an engine of the present character it is necessary, say during the starting and warm-up period when the engine is operating as a diesel, to limit the volume of the combustion space to that provided in the main cylinder 35. Thus valve element 103 serves the purpose of isolating the auxiliary combustion space, and accordingly assumes the position shown in Figs. 1 and 2 during the starting period.

*Liquid fuel system*

With reference to Figs. 1 and 6 to 10, a liquid fuel pump 111 which may be mounted on the engine frame structure in any convenient manner, is provided for each cylinder 35 and has a camshaft operated reciprocable plunger 112 whereby liquid fuel from a supply header 113 may be inducted through branch feed line 114 and periodically expelled at the proper injection pressure through discharge conduit 115. The fuel thus urged through conduit 115 is directed, by means of the injector valve 110 set in the head 36, into the main combustion chamber as a high velocity jet which is the usual practice in solid injection diesel engines. The quantity of liquid fuel so injected at each working stroke of the pump plunger 112 is regulated by a control rack 116 slidably carried in the pump housing, as shown in Figs. 6 and 8, and constantly urged in a direction to prevent fuel delivery by a spring 117. The rack 116 has a series of teeth 118 thereon for meshing engagement with a plunger rotating pinion gear 120. As will appear presently, the control rack has a longitudinal slot 121 formed therein for receiving a stop pin 122 such that the maximum travel of the rack may be predetermined for a desired range of fuel variation designated by the graduation marks or indicia scribed on the rack body in the manner shown. A pointer element 123 (Fig. 8) is secured to the pump housing in position to cooperate with the rack indicia so that the rack setting may be observed at all times.

The above described fuel pump is well known in the art, but for present purposes it has been modified with respect to the character of the plunger head. The preferred modification may be seen in Figs. 6 and 7, wherein the head portion of the plunger 112, while retaining the usual flat head face 125 for determining a constant beginning of fuel injection relative to closure of the fuel supply port 126, is suitably formed to provide a helically directed cut-off edge 127 having a flat or constant cut-off edge zone 128 for determining minimum fuel delivery. The plunger 112 is suitably under cut in a zone below the helical edge 127 to provide an annular relief groove 129 for the usual purpose of determining the end of the effective fuel delivery stroke. A cut-off slot 130 directed longitudinally of the plunger is also provided for determining no fuel delivery when the plunger is rotated to bring the slot into registry with the inlet port 126. In an engine of the present character where a pilot-injection of liquid fuel is required, it is essential to provide such a flat zone 128 on the usual helical cut-off edge 127 whereby to compensate for variations in the manufacturing tolerances relative to the forming of the rack slot 121 and cooperating stop pin 122, and assure the attainment of a minimum pilot fuel delivery setting for the pump. Moreover, when initially installing the several fuel pumps 111, it will be seen that the pilot-injection setting of each thereof may be readily attained with a balanced relationship for equal fuel injection action and consequent improvement in the operation of the engine.

*Gaseous fuel system*

Referring now to the gaseous fuel system, it can be seen that the main gaseous fuel conduit 131 leading from a remote source (not shown) is connected to the inlet chamber 132 of a master shut-off gas valve member 133. The outlet chamber 134 of this valve member is connected by a main gaseous fuel header 135 and branch conduit 136 with the ported inlet housing 137 forming a part of the general structure of the auxiliary combustion means 37 (Fig. 11). At each of the cylinders the housing 137 is suitably bored transversely of the gas inlet passage 138 (Fig. 11) to provide a cavity 140 for a rotary type fuel metering valve element 141. This valve is operatively secured therein and is suitably formed such that a slotted port 142 may effectively open or close the passage 138 through its relationship with the cut-off edge 139 between the passage and valve cavity. At the delivery side of the metering valve 141 the passage 143 communicates with a poppet valve chamber 144 and the auxiliary combustion chamber 39 therebeyond.

The metering valve element 141 has a shaft extending outwardly of the housing 137 for connection with an operating lever arm 146 such that the valve may be rotated for control of the quantity of gaseous fuel flowing through the slotted port 142 for ultimate delivery to the auxiliary combustion chamber means 37. The lever 146 is actuated through a safety link member 147 (Figs. 1 and 5), it in turn being actuated by a control lever 148 associated with the control system later to be described. The safety link 147 is so constructed that should a metering valve element stick, or refuse to work as intended, the remainder of the valve elements, as in a multi-cylinder engine, may still function between a fuel cut-off position and the setting assumed by the sticking valve element. Thus the engine may be shut down until the difficulty is corrected.

In the preferred form (Fig. 5) the safety link comprises a tubular member 150 having a plug element 151 fixed in one end by a cross pin 152, an internally positioned reduced diameter sleeve 153 threadedly secured in the opposite end of the member 150 by means of the base flange formation 154, and a rod element 155 telescoping the sleeve 153 and extending normally the length of the member 150 where an enlarged, flanged head 156 abuts the plug element 151 to provide a solid connection in one direction of motion of the link. The rod element, however, is normally held in solid abutment with plug 151 by a spring 157 which contacts the flanged head 156 of the rod and abuts the base flange 154 of the sleeve 153 in the annular space formed between the sleeve and tubular member 150. The plug 151 is connected by clevis 158 with operating lever 146 and the rod 155 is connected to the control lever 158 by a second clevis member 159. The required spring force is normally calculated on the basis of its adequacy to maintain rod head 156 in contact with the plug 151, but if the lever 148 becomes immobile the yielding nature of the spring 157 will allow relative movement between rod 155 and member 150.

Turning again to Fig. 11 it will be observed that the gaseous fuel metered through valve 141 is periodically admitted to the auxiliary combustion space 39 in means 37 by the action of poppet valve 160 in opening port 161. The valve 160 is provided with a stem 162 slidably mounted in the lower portion of structure 137 which stem has an end projecting outwardly for engagement by the roller element 163 of a rocker arm 164. The valve is normally urged in port closing direction by a spring 165 abutting the collar member 166 secured to the stem. Rocker arm 164, pivotally mounted on a bracket 167, is actuated by a push rod 168 extending to a cam follower element 169, in turn actuated by a suitable cam on camshaft 83.

Since the present engine may be started up as a diesel and then converted to the utilization of a gaseous fuel, means in the form of a fluid pressure relay system has been provided to open the master gas valve 133. The relay system (Fig. 1) includes a master sequence valve 171 receiving fluid under pressure from an engine driven pump 172 through conduit 173. A slide valve 174 having spaced piston elements 175 and 176 is movably mounted in the valve casing such that piston element 175 may close or open the port communicating with the fluid supply line 173 at predetermined times controlled by a plunger pin 179 mechanically held in opposition to the urging of a spring 177 positioned at the opposite end of the valve 174 relative to the pin 179. In the position shown, valve piston element 175 has cut off fluid supply line 173, but when the valve is allowed to move upwardly, by means later appearing, the line 173 communicates with the annular valve chamber formed between piston elements 175 and 176, and, as a result, pressure fluid will then flow out of the valve chamber to conduit 180. The master sequence valve 171 also is provided with a bleed line 181 connected thereto for control by the lower valve piston element 176. This latter piston element is so spaced relative to piston element 175 as to provide communication between the valve chamber and bleed line 181, when supply line 173 is cut off. The conduit 180 being open between each piston element of the slide valve 174 is therefore at all times in communication with the annular valve chamber and selectively in communication through this chamber with the fluid pressure supply line 173 or the bleed line 181.

Assuming now that the engine is rotating and the slide valve 174 has been allowed to move upwardly, by means later to be noted, to a position in which fluid under pressure can flow to conduit 180, it will be seen that such fluid passes along the said conduit to a fluid relay valve 182 which is structurally similar to the master sequence valve above described. The relay valve is provided with a slide element 183 having spaced piston valve elements 184 and 185 to define an intervening annular chamber 186 with the valve body. Here again the relay valve is provided with a plunger pin 187 mechanically urged in opposition to a spring element 196, by means external to the valve body as will appear presently, such that the piston element 184 permits communication between conduit 180 and the chamber 186. In this position the piston element 185 closes a valve port communicating with an emergency bleed line 189 with the result that fluid under pressure in chamber 186 will pass outwardly through the intermediate opening, into conduit 188 and into a valve operating motor cylinder 190, the latter associated with the master gas fuel valve 134. The pressure fluid entering cylinder 190 will force the motor piston 191 in a direction (to the left in Fig. 1), to abut a valve stem 192 on master poppet valve 193 and open the same to allow gaseous fuel to pass from inlet chamber 132 to outlet chamber 134 and hence to the main supply header 135 for the engine. The poppet valve 193 is normally spring urged in a closing direction, as shown.

Under normal conditions of engine operation the relay valve 182 will have its slide valve 183 held in the position shown in Fig. 1 which results in the conduit 180 being both a supply and return or bleed line relative to the master sequence valve 171, since the latter valve is made subject to active control means later appearing.

In the arrangement of the fluid pressure system just described the fluid bleed lines 181 and 189 connect with conveniently located fluid operated devices or engine operating adjuncts. However, in the schematic layout of Fig. 1 the disclosure indicates a fluid sump 195 to which the bleed lines extend. Similarly the fluid supply pump 172 is placed in this sump to draw up the fluid contained therein. It is most convenient to utilize oil as the fluid for the described system for obvious reasons.

*Engine control system*

In the course of the foregoing description frequent mention has been made of control means to which portions of the above systems are responsive for proper operation and to provide a different set of conditions for engine starting, operating as a diesel on liquid fuel and for normal gaseous fuel operation. Such a control system to be adequate for the present purpose may be described as comprising a manually operated sequence control system and an engine control system operatively responsive to the manual system and also automatically responsive to the load conditions of the engine.

The manual sequence control system (Fig. 1) includes a control lever 27 mounted on shaft 28 for movement through distinct and separate control positions as "Start 1," "Start 2," "Run" and "Stop," these positions being shown by Figs. 1, 2, 3, and 4 respectively. This rotary shaft 28 has the selector cam 29 secured thereto such that this cam rotates in a plane containing the valve plunger element 179 of master sequence valve 171. Shaft 28 also carries a second cam 204 for movement in a plane containing both of the poppet valve stems 74 and 91 respectively associated with the relay control valve 68 and distributor control valve 85.

It will be noted that the selector cam 29 is formed with a constant radius cam face 211 of considerable arcuate extent which merges abruptly at the lower side with a flat cam face 212, and at the upper side with a second flat cam face 213. Each of these flat cam faces extends chordwise of the cam disc and merges with a second arcuate cam face 214, the radius of which is equal to the radius of the first cam face 211. Noting now the control handle positions shown in Figs. 1 and 2, it will be clear that for positions designated "Start 1" and "Start 2" the cam face 211 will engage the head of plunger element 179 for the master sequence valve 171 and mechanically move the same inwardly of the valve such that the piston valve element 175 will cut off the supply of pressure fluid to the valve chamber. This effectively disables the supply of gaseous fuel by preventing pressure fluid from actuating the master shut-off gas valve 133 to open position. Now when the control handle 27 is moved to position "Run" (Fig. 3) the flat cam face 212 is moved over the valve plunger element 179 and permits the same to move outwardly so that the valve piston 175 now uncovers the pressure fluid inlet conduit 173 and valve piston 176 closes the bleed line 18. In this condition pressure fluid can pass to the actuator cylinder 190 and open the master shut-off gas valve. Upon further movement of the control handle to the "Stop" position (Fig. 4) arcuate cam face 214 contacts the plunger 179 to force the same inwardly thus repositioning the valve piston elements 175 and 176 to cut off supply of pressure fluid and open the fluid bleed line whereupon the master shut-off gas valve 133 will close.

In the disclosure of Fig. 1, selector cam 29 is rotated counterclockwise through the several positions noted. Similarly, the second cam 204 will be rotated in a counterclockwise sense through the same angular degree, as each of these cams 29 and 204 is carried on the common shaft 28.

Figure 2:
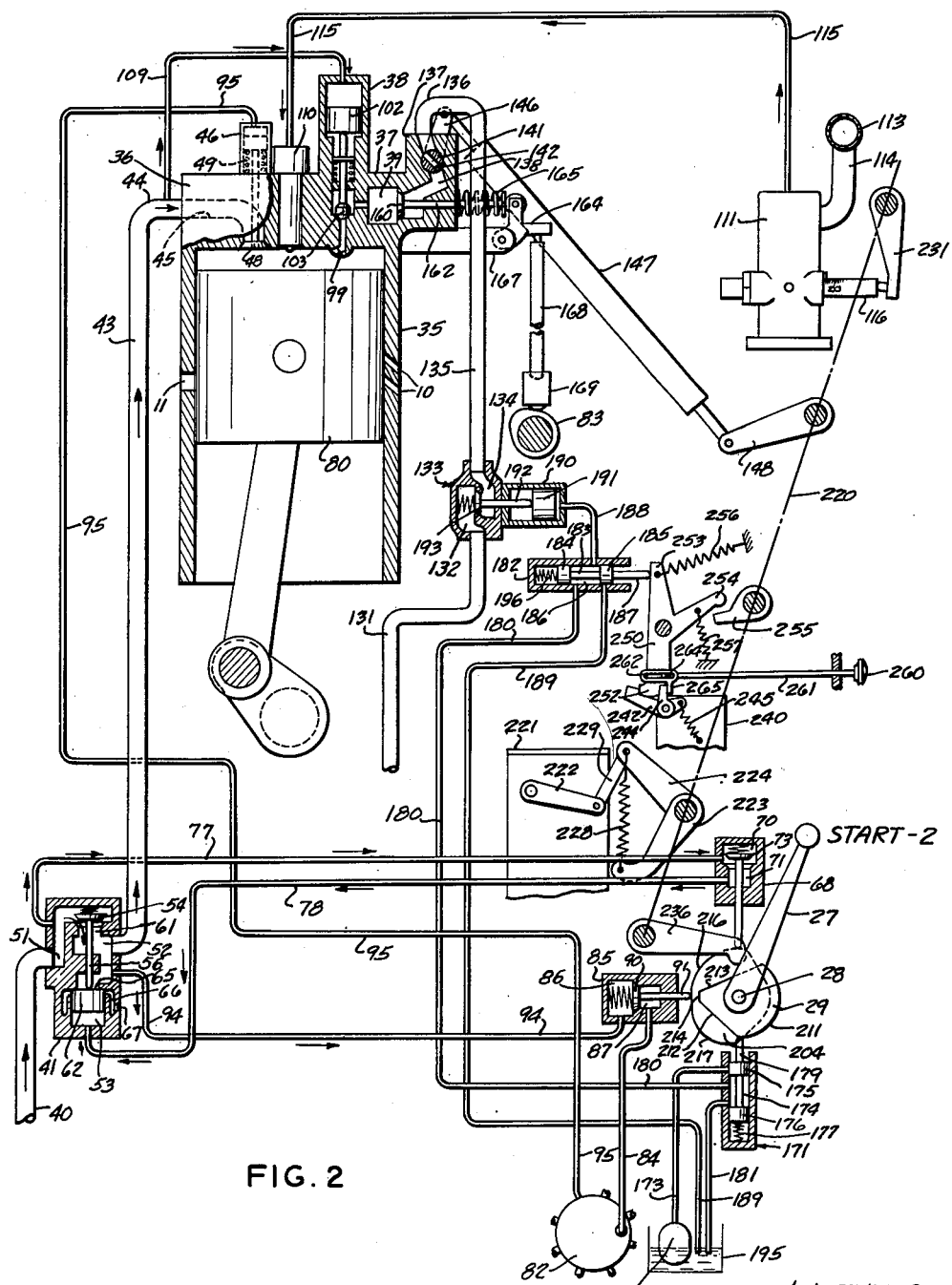
Fig. 2 is a view similar to Fig. 1 but showing a more advanced phase of the control system suitable for idling operation of the engine as a diesel.

The form of cam 204 in the profile thereof presents a constant radius cam face 216 which extends over substantially one quarter of the cam disc base circle. This cam face 216 merges with a raised lobe 217 and it, in turn merges with a relief cam face 218 which is substantially constant over the remainder of the cam disc circle except in the zone where it rises slightly and merges with the first mentioned cam face 216. As has been noted, cam 204 is positioned to engage each of the valve stems 74 and 91 of the relay control valve 68 and distributor control valve 85 respectively, for the purpose of controlling the sequential opening or closing of these valves. For example, when control handle 27 (Fig. 1) is moved to "Start 1" position, cam 204 will be rotated to a position in which cam lobe 217 opens valve 90 and cam face 216 opens valve 73. In the "Start 2" position which is shown in Fig. 2, the cam lobe 217 will move away from stem 91 permitting closure of valve 90, but cam face 216 remains effective to hold valve 73 open. Further rotation of handle 27 to the "Run" position (Fig. 3) will permit valve 73 to close as the cam relief face 218 is now under the associated valve stem 74. Valve 90 is not disturbed at this latter time and consequently remains closed since cam face 216 is out of working contact with its valve stem 91. For control handle position at "Stop" (Fig. 4) each of the air valves remains closed as will be clearly evident upon inspection.

It should now be recognized that upon positionment of the control handle 27 in each of its noted settings and upon the corresponding rotation of shaft 28, each of the cam members 29 and 204 is adapted to afford control response of certain valvular members of the engine starting and fuel supply systems for determining proper functioning thereof.

The automatically responsive operating control system, forming a part of the general engine control system, includes a control shaft 220, shown in broken line in each of Figs. 1 to 4 extending the length of the engine and rotatably supported by suitable bearings (not shown). This shaft, hereinafter called a fuel control shaft, is rotationally adjusted by an engine speed responsive governor 221 of any conventional type, but preferably of oil operated character, through the expedient of a safety lever connected between the governor arm 222 and the shaft 220. Essentially the safety lever includes a first crank arm 223 fixed to shaft 220, and an intermediate crank arm 224 sleeved on the shaft 220 and adapted for limited angular movement relative to the shaft and crank arm 223. Normally these lever arms 223 and 224 are held against relative movement by a tension spring 228, but the spring will yield to permit governor movement of arm 224 without corresponding movement of arm 223 under a condition hereinafter to be referred to, when the control shaft 220 is held against rotation. Intermediate lever 224 is linked with the governor operating arm 222 by an adjustable member 229 such that as the governor arm 222 moves clockwise (Fig. 1) say from its full fuel position toward a no fuel position the lever system 223, 224 will move counterclockwise, and the fuel control shaft will also rotate counterclockwise in response to such governor action.

The fuel control shaft 220 has distributed along its length the several lever arms 148 (only one being shown) which are fixed or clamped thereto in positions one opposite each cylinder to effect simultaneous operation of each of the gaseous fuel metering valves, before noted, upon rotational adjustment of the shaft by the governor 221. Moreover this fuel control shaft carries liquid fuel pump control levers 231 (only one shown) clamped thereto in proper positions, one opposite each cylinder to contact the end of the respective pump control racks 116 for simultaneous operation thereof. In Fig. 6, a typical pump control lever 231 is shown as provided with an adjustable tappet element 232 threaded through the lever and held in set position by the lock nut 233.

Rotation of the fuel control shaft 220 in a counterclockwise sense from the position showing in Fig. 1 will swing the lever 231 (Fig. 6) in a direction to reduce the fuel output of the pump 111 by permitting the spring 117 to move the pump rack 116 to the right, and normally at zero fuel output the pump plunger relief slot 130 registers with the fuel inlet port 126, as is well understood. However, in the present instance where a small pilot-ignition charge of liquid fuel is required for combustion of the gaseous fuel, it is not desired that the liquid fuel pump plunger be returnable to a zero fuel delivery position. Thus the stop pin 122 and rack slot 121 cooperate to maintain a predetermined minimum delivery and to prevent attainment of a zero fuel delivery setting.

As an example of the fuel pump operation relative to governor setting of the control shaft 220, Fig. 6 illustrates approximately the relative positions of pump rack 116 and control lever 231 at a time when the engine commences to fire on liquid fuel as a diesel. The pump will ordinarily deliver more fuel at starting than is necessary to maintain rated speed at no load and accordingly under automatic governor response lever 231 will swing in a counterclockwise direction to allow the rack to move in a fuel decreasing direction until the correct fuel quantity for no load and rated speed is attained, as illustrated in Fig. 9. When the engine is converted to the use of a gaseous fuel there is a momentary period when the liquid and gaseous fuel supply is in excess of the immediate requirements to maintain rated speed. Consequently, the governor will again move to reduce the fuel supply by further counterclockwise rotation of shaft 220 and in so doing lever arm 231 will swing away from and break contact with the pump control rack 116, thus conditioning the fuel pump 111 for minimum or pilot liquid fuel delivery. Fig. 10 illustrates this latter condition at the approximate moment when control lever 231 is about to break contact with the fuel control rack 116, after which the engine will be operated with gaseous fuel the combustion of which is effected by the pilot charge of liquid fuel delivered by the fuel pump.

Simultaneously with the above described control of the liquid fuel pump, as by rotational adjustment of the fuel control shaft 220, the gaseous fuel metering valve (Fig. 11) 141 is rotationally adjusted to control the quantity of such fuel admitted, provided that the master gas valve 133 is open to supply gaseous fuel to header 135 and branch lines 136. In view of Fig. 11 the full line position of the slotted orifice 142 in the metering valve corresponds to an initial governor setting at its full fuel position. However, during the period of liquid fuel diesel starting of the engine and adjustment of the liquid fuel pump 111 to the rack setting of Fig. 9, the metering valve 141 will be moved to the dotted outline position of its slotted orifice 142 which is still within the range of potential fuel gaseous fuel admission. Gaseous fuel not being supplied at this time due to a preferred control condition presently to appear, the gaseous fuel metering valve motion has no actual control function and simply moves toward its initial fuel metering position. This movement is herein referred to as the "over travel" or non-metering range adjustment of the metering valve.

Now with the metering valve slot 142 in its dotted outline position of Fig. 11 and the fuel pump rack set as in Fig. 9 for rated speed at no load, should gaseous fuel be supplied to the valve 141 the complementary quantities of liquid and gaseous fuel will cause an engine speed increase which immediately will be sensed by the governor 221. Governor response will rotate the fuel control shaft 220 in its fuel decreasing or counterclockwise direction to set the liquid fuel pump rack at its pilot charge position (Fig. 10), and to rotate the gaseous fuel metering valve in a clockwise direction such that the slotted orifice 142 begins to pass under the cut-off edge 139 of passage 138 (Fig. 11) to restrict the quantity of fuel flowing therethrough. However, the metering valve orifice 142 will still be open to an extent closely approximating a wide open setting and the governor 221 accordingly will continue valve rotation to reduce the gaseous fuel quantity being admitted to passage 143. As a result the fuel control shaft 220 will now swing control lever 231 out of contact with the liquid fuel pump rack 116 and the governor thereafter will be operative with respect to the gaseous fuel metering valve 141 alone.

When this last described condition is met the engine will be fully converted to the combustion of gaseous fuel with a substantially constant pilot-ignition charge of liquid fuel supplied by the pump 111. Once fully converted to gaseous fuel, any load variations on the engine will be met by automatic governor response to adjust the gaseous fuel metering valve 141 in a direction toward or away from full open setting. This condition is determined when the control handle 27 is in its "Run" position (Fig. 3), and as a precaution against rotation of the fuel control shaft 220 in a clockwise direction and to an extent sufficient to reestablish the fuel pump control levers 231 in contact with the pump racks 116 for moving the same inwardly to increase the quantity of liquid fuel supplied, the fuel control shaft 220 carries a lockout lever 236 (Fig. 3) fixed thereto in position in the plane of the cam 29 so that the constant radius cam face 211 will contact the end of lever 236 and prevent clockwise rotation of the fuel control shaft 220 beyond a setting corresponding to a wide open position of the gaseous fuel metering valve 141 and a setting in which control lever 231 is just out of abutment with the fuel pump rack 116. With the handle 27 in either of its "Start 1" or "Start 2" positions, Figs. 1 and 2 respectively, the flat chordwise face 213 of cam 29 is positioned adjacent the lock-out lever 236 and hence will permit full rotational adjustment of the fuel control shaft 220. In the "Run" and "Stop" positions of cam 29, Figs. 3 and 4 respectively, the cam face 211 will be under the lock-out lever 236 to prevent the rotation of fuel control shaft 220 to increase fuel delivery from the liquid fuel pumps 111 above the predetermined small pilot-ignition charge which in itself is determined to be insufficient to continue engine operation even at rated idling speed, no load conditions.

A full and complete understanding of the nature and function of the present engine control system as above described, may be found upon reference to Figs. 1 through 4 in which the essential parts and mechanism have been only diagrammatically set out, these views disclosing the successive order of events as they occur with reference to the respective control positions of handle 27.

Control setting Start 1

It is convenient to assume here that the engine is initially shut down and that the operator, finding the control handle 27 in the "Stop" position, moves the same in a clockwise direction to the "Start 1" limit of its travel, as shown in Fig. 1, thereby rotating the shaft 28 and the cams 29 and 204. Cam 29 is therefore set with its face 211 in position to hold the plunger 179 of master sequence valve 171 in its innermost position such that the piston element 175 cuts off pressure fluid admission line 173, to assure a closed condition of master gas valve 133 even though the engine crankshaft is not revolving and fluid under pressure from pump 172 is not available. It should be noted that the fluid pressure operated type governor 221 is inoperative also and accordingly the governor lever arm 222 will be in its fuel shut-off position, normally downwardly directed from the position shown in Fig. 1. In keeping with the fuel shut-off position of arm 222, the fuel control shaft will be rotated so that the fuel pump control lever 231 thereon is out of contact with the pump rack 116, permitting a minimum fuel delivery setting of the pump 111, while the gas metering valve control lever 148 thereon is displaced in a counterclockwise direction from that shown, to move the metering valve 141 to closed position, and the fuel lockout lever 236 is correspondingly displaced upwardly from the position assumed thereby in Fig. 1.

At the time the above conditions exist, the cam 204 will be positioned with its cam face 216 in contact with valve stem 74 of the air relay valve 68 to open the poppet 73, and with its cam lobe 217 in contact with valve stem 91 of the distributor control valve 85 to open the poppet 90. The immediate effect produced upon opening of the air relay valve 68 is to force the pilot piston 62 in the air relay valve 41 inwardly thereby opening the main air admission valve 54. This occurs by reason of the flow of compressed air from supply line 40 to conduit 77, through relay control valve 68 to conduit 78 and into chamber 53 of the air relay valve. The compressed air at line pressure flows to the air header 43 and to the respective branch lines 44 at each cylinder. Once the main air relay valve 41 is opened, as just described, pressure air flows into the conduit 94 and to and through the open distributor control valve 85 to conduit 84 for delivery to the air distributor 82. The latter device, even though not rotating, will usually be found to have an open feed line such as 95 whereby compressed air may flow to the air starting admission valve 46 to open the associated poppet valve 48. Compressed air admitted to the chamber above piston 80 will initiate crankshaft rotation and thus start rotation of the air distributor to supply air to others of the air start valves 46 for continuing the rotational effort of the crankshaft as is well understood.

During the occurrence of the foregoing events to achieve rotation of the engine crankshaft as well as its cam shaft, line air will also pass into the conduit 109 leading to the auxiliary cylinder means 38 for driving piston 102 downwardly to seat valve 103 whereby the auxiliary combustion chamber 39 is effectively isolated from the main combustion chamber in cylinder 25. With this actuation of piston 102 completed, the engine is fully adapted to begin operation as a diesel.

Again considering the governor 221, it can be appreciated that crankshaft rotation will make available pressure fluid for energizing the governor to move its control arm 222 to the full fuel position shown in Fig. 1. Concurrently the fuel control shaft 220 will move from the no fuel position, above described, to the full fuel position of the drawing. Thus the fuel pump 111 can deliver its maximum quantity of fuel to the injector valve 110 for injection to the cylinder combustion chamber. At the same time the gaseous fuel metering valve 141 will be moved to its non-metering range of adjustment, but no gaseous fuel is made available since the master gas valve 133 is held closed or in a gaseous fuel supply disabling position due to lack of pressure fluid on piston 191.

Liquid fuel being available at the injector valve 110, the engine will commence to fire as a diesel and upon sufficient speed pick-up, the operator next moves control handle 27 to the "Start 2" position. It is possible that before handle 27 is shifted the engine speed will exceed its rated idling condition, and in such event governor 221 will automatically move fuel control shaft 220 in a counterclockwise direction to reduce the quantity of fuel delivered by pump 111.

Briefly summarizing the control conditions existing when the control handle 27 is moved to "Start 1," it is evident from the foregoing discussion that:

1. The self-closing fluid operated master gas valve 133 is closed due to lack of fluid under pressure;
2. The engine starting air system is fully operative to admit air at line pressure to at least one cylinder for the initial impulse to rotate the crankshaft;
3. The air relay valve 41 is open to supply starting air;
4. The auxiliary combustion chamber 39 is isolated by closure of air operated valve 103;
5. The liquid fuel pump 111 is regulated by the governor 221 to a starting delivery condition, and
6. The gaseous fuel metering valve is rotated to an over travel position in a non-metering range, but is not supplied with gaseous fuel due to closure of the master gas valve 133.

Obviously these conditions either exist initially or are brought into being substantially simultaneously, due allowance being made for the inherent time lag in the fluid pressure systems and for response of the governor to effect fuel control shaft rotation.

Control setting Start 2

Referring now to Fig. 2 in which the control handle 27 is shown at its "Start 2" setting, it will be observed that the cam 29 on shaft 28 remains effective through cam face 211 to hold the master sequence valve 171 in position to prevent the supply of pressure fluid for opening the master gas valve 133. However, cam 204 will now be in position to permit closure of the distributor control valve 85 and render inoperative the air distributor 82 to open air start valve 46, since starting air is no longer required. Cam 204 will still remain effective through its cam face 216 to hold the relay control valve 68 open and assure continued closure of the valve 103 to hold the auxiliary combustion chamber 39 out of communication with the main combustion space in cylinder 35.

The engine is now operating as a diesel and the governor 221 will rotationally adjust the fuel control shaft 220 to set the rack 116 of liquid fuel pump 111 at the proper position for rated idling speed with no load. During this period of liquid fuel control by the governor, the gaseous fuel metering valve 141 will also be adjusted to the setting shown in Fig. 11, particularly the dotted line position of the slotted orifice 142 therein. Since no gaseous fuel is available at this time, the metering valve will be adjusted through its over travel or non-metering range toward or away from a position of potential full gaseous fuel admission. Thus it will appear that the gaseous fuel metering valve is initially rotationally adjusted through an over travel or non-metering range, in which no fuel throttling action occurs due to lack of a supply of gaseous fuel, and toward a control setting in which the metering valve is capable of producing a throttling effect upon further rotational adjustment. During this initial metering valve over travel adjustment, the liquid fuel pump 111 is simultaneously adjusted from a full open starting delivery setting of the control rack 116 toward a reduced fuel delivery setting which is determined to be sufficient for maintaining the engine at rated speed with no load. Thus the engine speed responsive governor 221 is called upon to perform the function of adjusting the gaseous fuel metering valve 141 and the liquid fuel pump 111 simultaneously and in the manner above described.

In the preferred arrangement, where the engine is started under no load as a diesel, the governor operating arm 222 is angularly displaceable from its position shown in Fig. 1, and corresponding to maximum supply of liquid fuel, toward a position of reduced liquid supply which is attained upon clockwise rotation thereof as viewed in the drawing. During this no load engine operating period in which the metering valve 141 and fuel pump rack 116 are adjusted as above pointed out, only an initial portion of the full angular displacement of governor arm 222 is required. Therefore and in order to distinguish this initial angular displacement of arm 222 from the remaining displacement thereof, it will be convenient to refer to the full governor arm travel as being divided into a first control range or inner angular range of displacement for liquid fuel supply control and a second control range or outer angular range of displacement for gaseous fuel supply control. As pointed out above, the governor response for the "Start 2" or diesel operation of the present engine will be confined to the first or inner angular range of displacement for the reason that the liquid fuel pump 111 is operative to supply starting fuel and also to supply fuel for maintaining rated idling speed at no load, the gaseous fuel metering valve 141 being adjusted simultaneously through its over travel or non-metering range toward or away from a position at which further movement of the fuel control shaft 220 in a counterclockwise direction will move the slotted valve orifice 142 under the cut-off edge 139.

Accordingly with the control handle 27 moved to the "Start 2" position, the control system will respond such that:

1. The liquid fuel pump 111 will be under governor control and delivering fuel to keep the engine running at rated speed with no load applied;

2. The master gas valve 133 will be closed due to positionment of the master sequence valve 171 by cam 29;

3. The gaseous fuel metering valve 141 will be adjusted by the governor 221 but will not be effective as no fuel is delivered thereto;

4. The starting air admission valve means 46 will be rendered inoperative by closure of the distributor control valve 85, and 5. The auxiliary combustion chamber 39 will be isolated due to closure of valve 103.

*Control setting Run*

Figure 3:
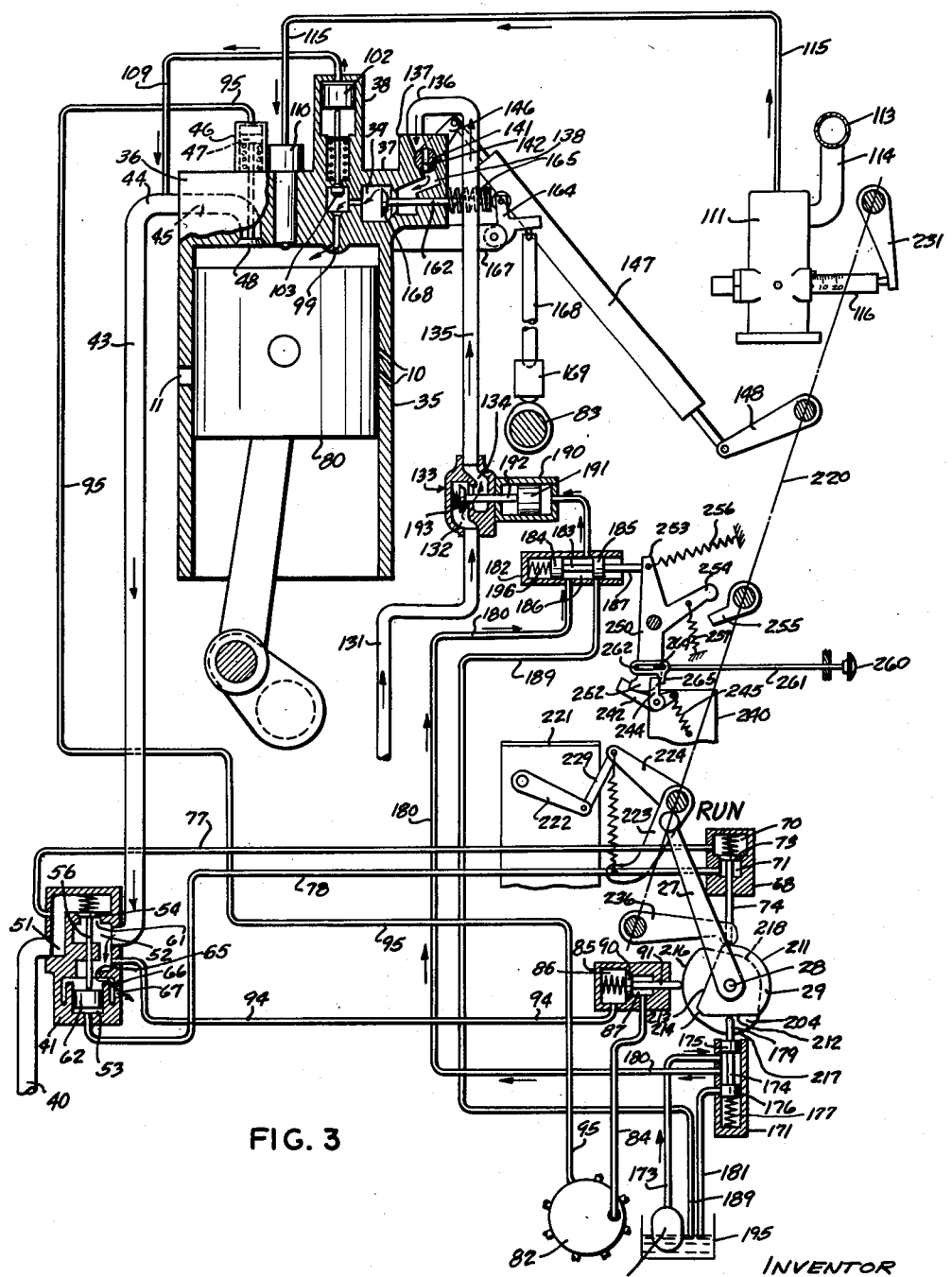
Fig. 3 is still a further schematic view showing the control system conditioned to permit conversion of the engine for operation on gaseous fuel with pilot-ignition liquid fuel supply.
Figure 4:
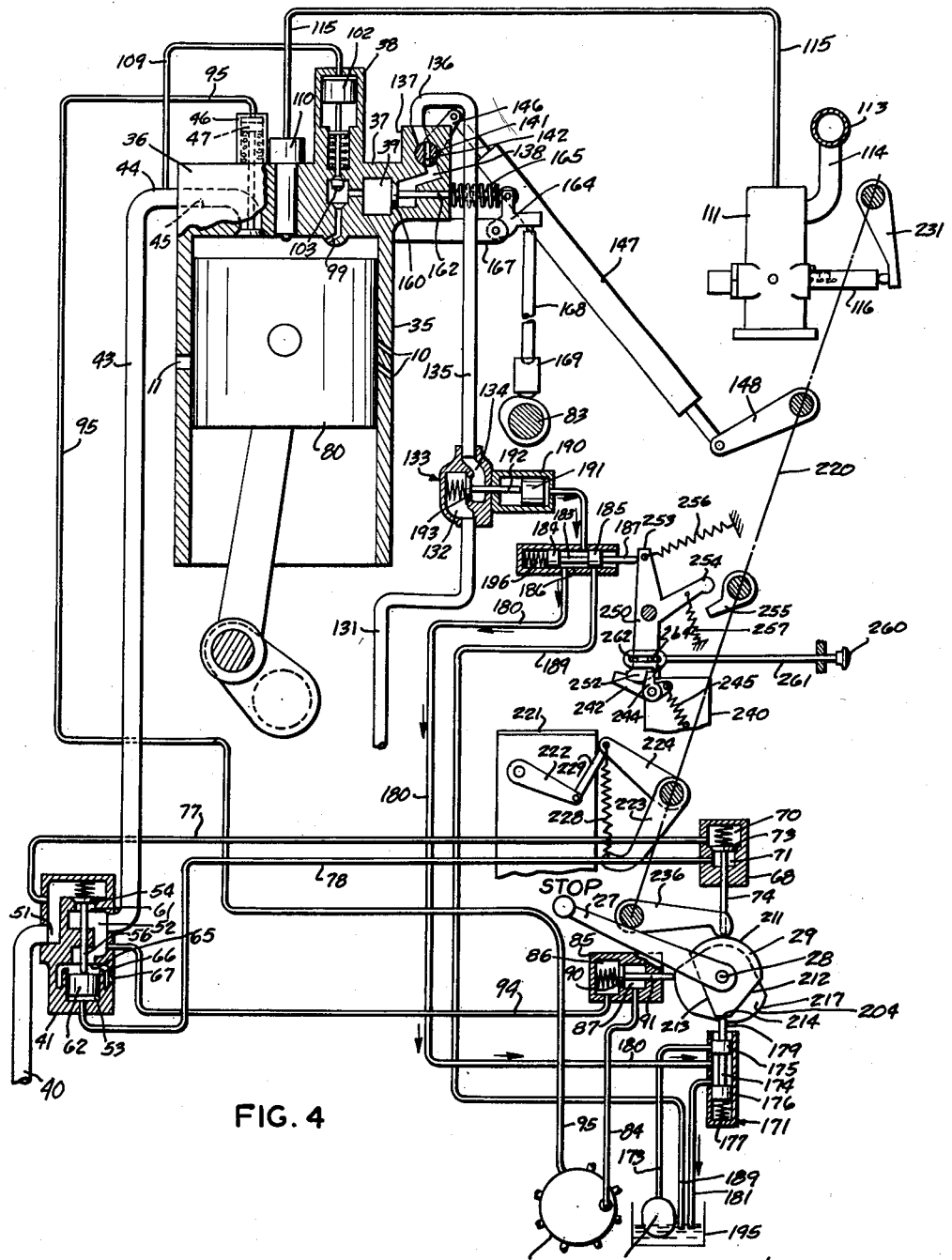
Fig. 4 illustrates in schematic form the condition of the control system when the engine is to be shut down.

Once the engine is operative as a diesel, at its no load, rated idling speed, the operator may convert the engine to gaseous fuel combustion by shifting the control handle 27 into the "Run" position of Fig. 3. Upon such movement of the control handle 27, the cam 29 will be displaced so that the flat cam face 212 will allow the master sequence valve 171 to change its position, opening the pressure fluid supply line 173 and closing the bleed line 181. Pressure fluid is then available for flow through conduit 180, fluid relay valve 182 and conduit 188 to the cylinder 190 at the master gas valve 133 for opening the latter valve to enable supply of gaseous fuel to the header 135, branch line 136 and metering valve 141. Simultaneously with movement of cam 29, cam 204 will move to allow closure of the relay control valve 68 and hence closure of the air relay valve 41 to discontinue the supply of compressed air to header 43, branch line 44 and conduit 109. Upon closure of the air relay valve and downward movement of the pilot piston 62, the air vent port 67 will be opened to permit escape of air from the aforementioned header 43 and from line 109, thereby allowing movement of the auxiliary piston 102 under spring urging to open the valve 103 and establish communication between the auxiliary combustion chamber 39 and main combustion chamber in cylinder 35. At the time the above events occur, cam face 211 on cam 29 will move under the lock-out lever 236 and prevent further movement of the fuel control shaft 220 in a clockwise direction to increase the quantity of liquid fuel delivered by pump 111 above that quantity required for pilot ignition, which is insufficient of itself to maintain engine operation. Therefore, the cam 29 and lock-out lever 236 cooperate to prevent the governor from operating with its arm 222 in the first or inner range of angular displacement or, in other words from again moving in a direction (counterclockwise as viewed in Fig. 2) to effect increasing delivery of liquid fuel. As a result the fuel pump 111 is positively limited to delivery of only a pilot-ignition fuel charge for the purpose of initiating combustion of the gaseous fuel charge admitted by the metering valve 141 and poppet valve 160 to the chamber 39 in means 37.

In the preferred construction of the cam 29 and form of the cam surfaces 211 and 212 with respect to the disposition of lock-out lever 236 and master sequence valve 171 respectively, it is intended that upon rotation of the cam 29 by handle 27 to the "Run" position (Fig. 3) the valve 171 will permit opening of the master gas valve 133 to enable the flow of gaseous fuel to the engine slightly in advance of any mechanical contact between cam surface 211 and the lock-out lever 236. The reason for this is that if the lock-out lever 236 is mechanically moved to shift the fuel control shaft 220 to the minimum liquid fuel delivery setting of the pump 111 ahead of the flow of gaseous fuel through valve 133, the engine may falter or miss-fire with consequent loss of speed.

Assuming now that the no load conversion of the engine to gaseous fuel attended by only a pilot-ignition charge of liquid fuel has been effected, it will be observed that the gaseous fuel metering valve 141 is at its full open setting, thereby admitting more fuel than is required.

Accordingly, the governor 221 will respond by movement of its arm 222 in a no fuel direction which, as above noted in connection with the description of "Start 2" operation, results in governor operation in the second or outer range of angular displacement of its arm. When this occurs the liquid fuel pump control lever 231 will break contact with the rack 116 and the lock-out lever 236 will move away from the cam face 211, both levers moving in a counterclockwise direction.

After the initial conversion period when the liquid fuel supply is being reduced to the predetermined pilot-ignition charge setting as by abutment of stop pin 122 in the inner end of rack slot 121 (Fig. 10), and the supply of gaseous fuel is being established upon opening of master valve 133 by means of fluid pressure admitted to the cylinder 190 through appropriate actuation of master sequence valve 171, the engine will be fully conditioned to utilize a gaseous fuel. Concurrently therewith the governor control response for moving the fuel control shaft 220 will be positively confined to the limits of its outer range of angular displacement of arm 222, as by the lock-out lever contacting the cam face 211 for maximum gaseous fuel supply and the condition of closing movement of the metering valve 141 for throttling the fuel supply.

In view of the above discussion relating to the "Run" position of control handle 27, it is appreciated that:

1. The liquid fuel pump 111 is reduced to the function of delivering only a pilot-ignition charge of fuel for igniting the main charge of gaseous fuel admitted to the auxiliary combustion chamber 39 for admixture with combustion air from the cylinder 35;

2. The master valve 133 is opened by pressure fluid flowing from the master sequence valve 171;

3. The auxiliary combustion chamber is opened upon retraction of the valve 103 due to relief of compressed air from auxiliary cylinder 38 through the air relay bleed port 67, and 4. The gas metering valve 141 is under governor control and regulated to deliver fuel as required by the load on the engine.

It will be appreciated that the engine, when converted to the use of gaseous fuel, may be reconverted at any time to liquid fuel operation by shifting the selectivity control handle to the "Start 2" position, in which position the master gas supply valve 133 will close and the cam 29 will move away from the lock-out lever 236 to permit rotation of fuel control shaft 220 into its inner range of displacement for reestablishing the control over the fuel pumps. The return to liquid fuel operation is best accomplished with no load on the engine. In this conversion to liquid fuel operation, the auxiliary combustion chamber 39 will again be isolated.

*Control setting Stop*

When it is desired to shut the engine off, the operator moves control handle 27 to the "Stop" position (Fig. 4) whereupon the cam 29 is further rotated to the setting at which the cam face 214 is effective to shift the valve pistons of master sequence valve 171 to close off fluid line 173 and open bleed line 181 to the conduit 180 for draining fluid from the master gas valve actuating cylinder 190 thereby allowing the valve 133 to close, thus again disabling the supply of gaseous fuel to the header 135. As the residual gaseous fuel in header 135 is used up, the governor 221 will automatically call for more fuel and will respond by moving its arm 222 in a counterclockwise direction to rotate the fuel control shaft 220 through its outer range of movement and in a direction (clockwise) fully to open the gaseous fuel metering valve 141. Since the gaseous fuel supply is shut off the governor will then attempt to continue its movement to increase fuel but due to the lock-out lever 236 moving into contact with the cam face 211 of cam 29, the governor arm 222 will be prevented from moving beyond the inner limit of its outer range of angular displacement and, as a result, the fuel pump 111 cannot be adjusted to supply more than its pilot-ignition charge. The consequence of this action of lock-out lever 236 will be to maintain the minimum liquid fuel supply which is not of itself sufficient to operate the engine and the engine will then eventually cease operating when the gaseous fuel in the header 135 is exhausted or reduced to an inconsequential amount.

At the time handle 27 is moved to the "Stop" position, cam 204 will be rotated so that the relay control valve 68 and distributor control valve 85 remain closed thus preventing any possibility of air admission to the several adjunctive elements of the engine for initiating starting. In this position of the control handle 27 it is now appreciated that:

1. The master gaseous fuel valve 133 will be closed;

2. The gaseous fuel metering valve will be moved by the governor to continue gaseous fuel delivery from the residual fuel in the header 135 until the volume is insufficient to keep the engine running;

3. The liquid fuel pump 111 will be held to its pilot-ignition position of fuel delivery which is insufficient of itself to keep the engine running, and 4. The starting air system will be held inoperative by the position of cam 204.

*Engine overspeed and safety stops*

In an engine of the above described character means has been provided for stopping the engine should the need arise as in a mechanical failure emergency or should the engine attain dangerously high speeds.

With reference to Fig. 1, the engine overspeed safety mechanism may include a fluid pressure operated overspeed governor 240 of any standard construction, suitably connected to the engine lube-oil system for supply of oil and under a pressure which is proportional to the rotational speed of an engine driven oil pump (not shown). This overspeed governor conveniently mounted on the engine structure, is equipped with a main governor shaft to which is fixed at the exterior of the casing a movable latch element 242 having a notch formed thereon. The element 242 also has a trip finger 244 formed as an integral portion thereof for a purpose presently to appear. This latch element is biased in a clockwise direction as viewed in Fig. 1, by an external governor loading spring 245.

Cooperating with the overspeed governor latch element 242 is a trip lever 250 pivoted at 251 and arranged such that the lower end flanged portion 252 of the trip lever registers with the notch of latch 242 when the engine is in normal operation. The trip lever 250 is provided also with divergent arms, one arm 253 being adapted to contact the head of the plunger pin 187 for the fluid relay valve 182 and the other arm 254 being adapted to contact an element 255 fixed on the fuel control shaft 220. Springs 256 and 257 respectively attached to arms 253 and 254 of the trip lever 250 serve to urge the lever in a clockwise direction as to an overspeed released position when the governor latch 242 is actuated to break contact between the notch of latch 242 and flange 252. When this occurs, only for engine overspeed conditions, the lever 250 moves clockwise to the limit of its angular displacement determined by a suitable adjustable stop element (not shown), thereby releasing the plunger pin 187 and forcibly rotating the fuel control shaft through abutment with the member 255 to a no fuel delivery position. It is preferred that the combined forces of springs 256 and 257 be sufficient to force rotation of the fuel control shaft 220 to its no fuel position against the tension spring 228, the latter serving normally to hold arms 223 and 224 in fixed angular relation. Thus the overspeed trip lever 250 may override the fuel control governor 221 regardless of the force being exerted on the governor arm 222 and not be required to return the governor to its no fuel position.

Coincident with the movement of the fuel control shaft to no fuel position upon overspeed release action of the overspeed governor 240, the fluid relay valve 182 is allowed to shift from its normal setting (Fig. 1) to a position in which the piston 184 closes fluid inlet conduit 180 and piston 185 opens the bleed conduit 189. The fluid pressure built up in cylinder 190 to hold master gas valve 133 open is thereupon relieved to the bleed conduit and the gaseous fuel supply line 131 cut off. As a result the gaseous fuel supply is positively terminated and only the pilot-ignition charge of liquid fuel is available, which in itself is not sufficient to keep the engine operating.

In the event it is desired to shut down the engine quickly even though there is no overspeed condition or when the overspeed mechanism refuses to function correctly, the trip lever 250 may be forcibly released from the holding notch 243 on the latch element 242, by pressing inwardly on the emergency stop button 260. This stop button is connected by push rod 261 with a fitting 262 which is provided with an elongated slot for receiving a guide pin 264 fixed on the trip lever 250 at a zone intermediate the ends of the slot. Normally the pin is free to move in the slot during overspeed operation of the governor 240, but upon inward movement of button 260 the fitting slides on pin 264 and a depending finger 265 engages trip finger 244 on latch 242 and pivots the same in a direction to release the trip lever 250 for stopping the engine in the manner before described.

Aside from the above noted emergency operation of the button 260, it is important to note that this means is also employed for re-setting the overspeed mechanism once it has been tripped. In so utilizing this button 260, an outward pull thereon will effect engagement of the slotted fitting 262 with pin 264 to result in counterclockwise rotation of the lever 250 such that the flange 252 re-engages the notch in the trip finger 242 of the overspeed governor 240.

It will now be fully appreciated from the foregoing description of structure and cooperation of the various control systems relating to an internal combustion engine of diesel type capable of operating with a gaseous fuel ignited by a pilot-ignition charge of liquid fuel, that the desired control functions and regulation of an engine of this character may be obtained equally as well with modifications and alterations of structure and rearrangements of control expedients from that shown here, and it is the purpose and intent to cover all such modifications and alterations as may fully and completely come within the spirit and scope of the present invention as the same is defined in the appended claims.

What is claimed is:

1. In a dual fuel internal combustion engine of two-cycle type, a cylinder and piston therein defining a cylinder combustion chamber, the cylinder having piston-controlled air admission and exhaust ports, means providing an auxiliary combustion chamber, a passageway between said chambers, an engine driven fuel pump for supplying liquid fuel to the cylinder combustion chamber, said pump including a regulating element biased to an initial position determining a minimum or pilot quantity delivery by the pump, and movable therefrom for regulating pump delivery between said minimum quantity and a maximum quantity, conduit means for supplying gaseous fuel to said auxiliary combustion chamber, said conduit means including a supply control valve and a metering valve providing a movable valve element having an initial fuel metering position, said valve element being movable in one direction relative to its said initial position through a gaseous fuel metering range, and in the opposite direction relative to said initial position through a non-metering range, an engine driven governor operable through first and second control ranges, a governor actuated member operatively connected to said metering valve element, an arm fixed on said member in a position for operating engagement with said pump regulating element, said governor when operating in said first control range thereof, actuating said member to operate said metering valve element in said non-metering range thereof and to effect through engagement of said arm with said pump regulating element, movement of said regulating element for regulating pump delivery between said minimum and maximum quantity delivery, and said governor when operating in said second control range thereof, actuating said member to operate said metering valve element in said gaseous fuel metering range thereof and to displace said arm from engagement with said pump regulating element, with the regulating element then in said biased initial position thereof to determine said pilot quantity delivery by the pump, selectively conditionable control means effective in one control condition for establishing closure of said supply control valve during engine operation with the governor operating in said first control range, and effective in a second control condition for establishing an open condition of said supply control valve during engine operation with the governor operating in said second control range, a stop element on said governor actuated member, and an abutment element positionable with selective conditioning of said control means, the abutment element in said second control condition of the control means, being positioned for engagement by said stop element to restrain said governor actuated member against governor actuation thereof to engage said arm with said pump regulating element.

2. In a dual fuel internal combustion engine of two-cycle type, a cylinder and piston therein defining a cylinder combustion chamber, the cylinder having piston-controlled air admission and exhaust ports, means providing a combustion space auxiliary to the cylinder combustion chamber, a passageway interconnecting said chamber and space, a valve device in control of said passageway, an engine driven variable delivery fuel pump for supplying liquid fuel to the cylinder combustion chamber, said pump including a regulating element biased to an initial position determining pump delivery of a minimum or pilot fuel quantity and movable therefrom for varying pump delivery between said minimum and a maximum fuel quantity, gaseous fuel supply means for said combustion space, including a supply control valve and a metering valve providing a movable valve element having an initial fuel metering position, said valve element being movable in one direction relative to its said initial position through a gaseous fuel metering range, and in the opposite direction relative to said initial position through a non-metering range, engine starting and running control means selectively conditionable for effecting in one control condition thereof, closure of said gaseous fuel supply control valve and closure of said valve device to close said passageway, said control means effecting in a second control condition thereof, opening of said supply control valve and said valve device, an engine driven governor operable through first and second control ranges, a governor actuated member operatively connected to said metering valve element, and an arm on said governor actuated member in a position for engagement with said pump regulating element, said governor operating in said first control range thereof during engine operation with said control means in said one control condition thereof, and actuating said member to operate said metering valve element in its said non-metering range and to operate said arm in engagement with said pump regulating element to position the element for regulating pump fuel delivery between said minimum and maximum, and said governor operating in said second control range thereof during engine operation with said control means in said second control condition, and actuating said member to operate said metering valve element in its said metering range and to locate said arm out of engagement with said pump regulating element, said element then being in its said biased initial position.

3. In a dual fuel internal combustion engine as defined by claim 2, characterized further by stop means operatively associated with said governor actuated member, and abutment means effective in said second control condition of the control means and through engagement of said stop means therewith, for restraining the governor actuated member against governor actuation thereof to engage said arm with said pump regulating element.

STUART D. KLINGER.

References Cited in the file of this patent

UNITED STATES PATENTS

| Number | Name | Date |
|---|---|---|
| 1,833,265 | Schmidt | Nov. 24, 1931 |
| 1,858,824 | Heidelberg | May 17, 1932 |
| 2,400,219 | Barnaby et al. | May 14, 1946 |
| 2,400,247 | Miller et al. | May 14, 1946 |
| 2,562,511 | Schowalter | July 31, 1951 |

OTHER REFERENCES

"The Oil Engine" of December 1941, pp. 199–201.